US008831357B2

(12) United States Patent
Rudin et al.

(10) Patent No.: US 8,831,357 B2
(45) Date of Patent: Sep. 9, 2014

(54) SYSTEM AND METHOD FOR IMAGE AND VIDEO SEARCH, INDEXING AND OBJECT CLASSIFICATION

(75) Inventors: Leonid I. Rudin, San Marino, CA (US); Jose L. Lisani, Pasadena, CA (US)

(73) Assignee: Cognitech, Inc., Pasadena, CA (US)

( * ) Notice: Subject to any disclaimer, the term of this patent is extended or adjusted under 35 U.S.C. 154(b) by 809 days.

(21) Appl. No.: 12/268,261

(22) Filed: Nov. 10, 2008

(65) Prior Publication Data

US 2009/0257662 A1    Oct. 15, 2009

Related U.S. Application Data

(60) Provisional application No. 60/987,012, filed on Nov. 9, 2007.

(51) Int. Cl.
*G06K 9/00* (2006.01)

(52) U.S. Cl.
CPC ................................ *G06K 9/00771* (2013.01)
USPC ......................................................... 382/218

(58) Field of Classification Search
USPC ................................................. 382/103, 107
See application file for complete search history.

(56) References Cited

U.S. PATENT DOCUMENTS

| | | | | |
|---|---|---|---|---|
| 7,545,417 | B2 * | 6/2009 | Miwa ............................ | 348/234 |
| 2002/0037103 | A1 * | 3/2002 | Hong et al. ................... | 382/173 |
| 2002/0168091 | A1 * | 11/2002 | Trajkovic ...................... | 382/107 |
| 2003/0044045 | A1 * | 3/2003 | Schoepflin et al. ........... | 382/103 |
| 2003/0059107 | A1 * | 3/2003 | Sun et al. ....................... | 382/165 |
| 2003/0190090 | A1 * | 10/2003 | Beeman et al. ............... | 382/284 |
| 2005/0078853 | A1 * | 4/2005 | Buehler et al. ................ | 382/103 |
| 2006/0015492 | A1 * | 1/2006 | Keating et al. .................... | 707/4 |
| 2006/0204077 | A1 * | 9/2006 | Lim et al. ....................... | 382/154 |

OTHER PUBLICATIONS

Buades, A., et al. "Adaptive Change Detection" IEEE International Workshop on Systems, Signals, and Image Processing (IWSSIP), 2009.
Cao et al., "A Theory of Shape Identification" to Appear in Lecture Notes in Mathematics. Springer 2008.
Delon, Julie et al. "A Nonparametric Approach for Histogram Segmentation" IEEE Transactions on Image Processing, vol. 16, No. 1, Jan. 2007, pp. 253-261.
Delon, J., et al. "Automatic Color Palette" IEEE International Conference on Image Processing (ICIP-05), Genova, Sep. 11-14, 2005.
Delon, J., et al. "Automatic Color Palette" Inverse Problems and Imaging, vol. 1, No. 2, 2007, pp. 265-287; www.aimSciences.org.
Desolneux, Agnes et al. "A Grouping Principle and Four Applications" IEEE Transactions on Pattern Analysis and Machine Intelligence, vol. 25, No. 4, Apr. 2003, pp. 508-513.
Desolneux, et al., "From Gestalt Theory to Image Analysis: A Probabilistic Approach" Springer Verlag Series: Interdisciplinary Applied Mathematics, vol. 34, 2008.
Desolneux, et al., "From Gestalt Theory to Image Analysis: A Probabilistic Approach" Jul. 10, 2006.

(Continued)

*Primary Examiner* — Hadi Akhavannik

(57) ABSTRACT

Indexing regions of changed pixels (ROCHs) in a collection of images by receiving a collection of images. Estimate and/or validate a background among the collection of images. Detect the changes between images in the collection. Associate the detected changes between the images and classifying the associated changes. This image processing method and system may be used for image indexing and object classification.

18 Claims, 10 Drawing Sheets

(56) References Cited

OTHER PUBLICATIONS

Lisani, J.L., et al. "On the Theory of Planar Shape" Multiscale Model Simul. vol. 1, No. 1, Society for Industrial and Applied Mathematics, 2003, pp. 1-24.

Monasse, Pascal "Contrast Invariant Image Registration" In Proceedings of International Conference on Acoustics, Speech and Signal Processing, vol. 6, Phoenix AZ, 1999, pp. 3221-3224.

Monasse, Pascal et al. "Fast Computation of a Contrast-Invariant Image Representation" IEEE Transactions in Image Processing, vol. 9, No. 5, May 2000, pp. 860-872.

* cited by examiner

US 8,831,357 B2

SYSTEM AND METHOD FOR IMAGE AND VIDEO SEARCH, INDEXING AND OBJECT CLASSIFICATION

CROSS-REFERENCE TO RELATED APPLICATIONS(S)

This application claims the benefit of U.S. Provisional Patent Application No. 60/987,012, filed Nov. 9, 2007, the disclosure of which is incorporated by reference herein.

BACKGROUND OF THE INVENTION

The present invention relates generally to image analysis, and more particularly to image searching indexing and object classification.

Image analysis may be performed for a variety of reasons. One may wish to attain greater knowledge of what is disclosed by a particular image of set of images, for example whether an image or set of images includes particular persons or objects, or other information, and image analysis may be performed on the image or images to provide such information. One may also wish to categorize images by common features in the images or other aspects of the images.

BRIEF SUMMARY OF THE INVENTION

In various embodiments the invention provides for analysis and use of analysis of video images. In one aspect the invention provides a method performed by a computer for searching, classifying and indexing objects in a collection of images comprising: receiving images; estimating a background for the images; detecting changes between images and the background; associating at least some of the changes between the images and the background; classifying associated changes; and saving the information of the classified associated changes. In another aspect the inventor provides a method of determining a background among a collection of images comprising: receiving images; detecting changes between pairs of the images; and classifying pixels in the images based number of times the pixel changed in each of the image pairs. In another aspect the invention provides a method for detecting changes between images comprising: receiving images; sub-dividing the images into sub-image blocks; determining differences between corresponding sub-image blocks between the images; and comparing the differences to the threshold.

In another aspect the invention provides a method for associating detected regions of change in a collection of images comprising: receiving images; detecting changes between an image of the images and a background; determining connected regions of changed pixels (ROCHs); associating ROCHs to other images; and saving the associationed ROCHs.

In another aspect the invention provides a method for comparing a collection of image to an image of a reference object comprising: receiving images and at least one image of a reference object; associating a region of change in at least one of images with the image of reference object; and saving the association information.

In another aspect the invention provides a method for modifying the pixels in a region of change in an image, comprising: receiving images; detecting changes between images and a background; determining connected regions of changed pixels (ROCHs); and replacing at least a portion of pixels of at least one ROCH with a different pixels.

In another aspect the invention provides a method for event detection comprising: receiving at least two background images of a scene from two different time periods; sub-dividing the images into sub-image blocks; determining differences between corresponding sub-image blocks, and -comparing the differences to a threshold.

These and other aspects are more fully comprehended upon review of this disclosure.

DETAILED DESCRIPTION

In the following description reference is made to the accompanying drawings which form a part hereof and in which is shown by way of illustration specific embodiments in which the invention may be practiced. It is understood that other embodiments may be utilized and structural changes may be made without departing from the scope of the present invention.

Figure 1:
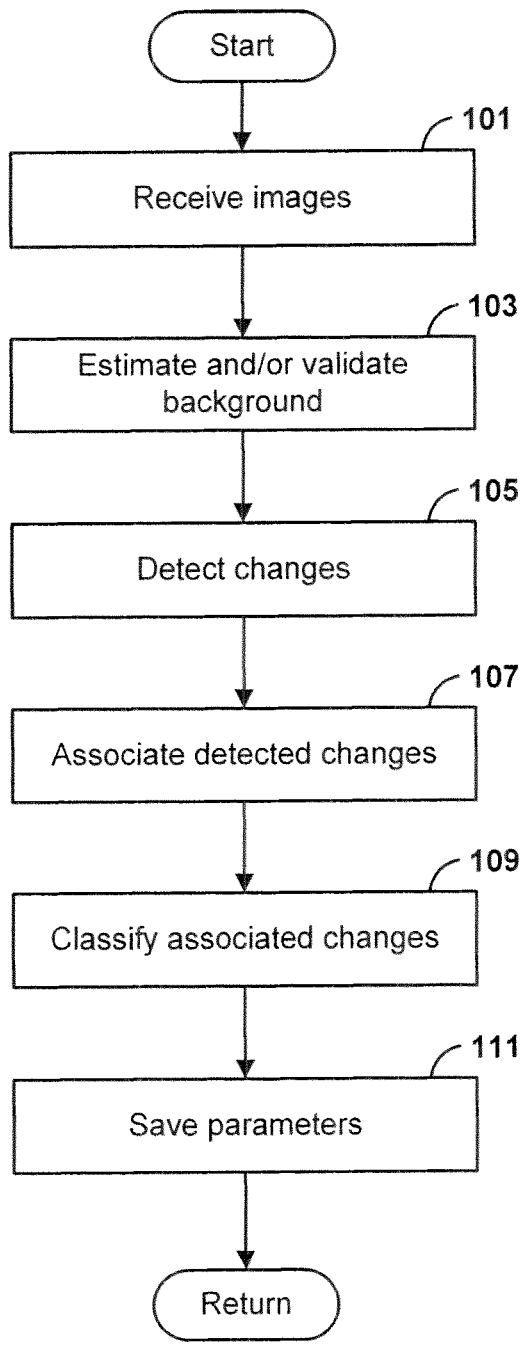
FIG. 1 is a flow diagram of a method showing one aspect of the present invention for classifying objects in an image.

FIG. 1 shows a flow diagram of a process for classifying and/or indexing a collection of images such as video images or video frames. In some embodiments the method is performed by a system or device later discussed with respect to FIGS. 8-10. In block 101 the process receives images. In many embodiments the images are images captured by a camera. For example, in some embodiments the images are images of scenes of a particular locations, with for example the images taken by the camera periodically over a period of time. Thus, for example, the images may be of one or more locations captured by cameras of a security system, or images providing surveillance of one or more locations. In one embodiment receiving images comprises receiving digitally formatted images such as images in a JPEG format, into a memory. In other embodiments, receiving images comprises receiving a plurality or collection of digitally formatted images into a memory such as a plurality of JPEG images. In other embodiments, receiving images comprises receiving an entire sequence of moving images or video frames such as a digital movie in other formats into a memory. Some examples of common digital movie formats include MPEG, WMV. AVI or DiVX. In other embodiments receiving images comprises receiving an indication of location of a digital file including image information.

A collection of images in one embodiment refers to a sequence of images taken by one or more image recording devices. In another embodiment, a collection of images refers to video frames recorded by one or more video capture and/or recording devices such as a video camera. In another embodiment, a collection of images refers to one or more images taken by one or more cameras. In another embodiment, a collection of images refers to one or more images taken by one or more cameras and video frames recorded by one or more video capture and/or recording devices such as a video camera. In one embodiment a frame or an image refers to a single image in a video sequence. In another embodiment a frame or an image refers to a single JPEG image.

In block 103 the process estimates and/or validates the background image. In one embodiment, estimating the background comprises selecting pairs of images from a collection or sequence of images, determining the changes between each of the pairs of images, selecting the pixels that have been changed less than a threshold of the time in all of the pairs, and assigning these pixels as background pixels. In another embodiments validating the background comprises selecting an initial background image and selecting an image from a collection or sequence of images, determining the changes between each of the images and the initial background, selecting the pixels that have been changed less than a threshold of the time in all of the images, and assigning these pixels as background pixels. Pixels not assigned as "background" may be labeled as "non-background".

In block 105 the process detects changes between the images and the background image. In one embodiment detecting changes comprises subdividing the images (e.g. background image and images from the collection of images) into sub-image blocks and determining changes between corresponding sub-image blocks from different images. The background image may be included in the collection of images or it may be estimated. In one embodiment detecting changes comprises selecting two images or pair of images at a time (e.g. background image and an image selected from the collection of images or any two images from the collection of images) and determining the difference in color or grey level between corresponding sub-image blocks in both images. In some embodiments a sub-image block is considered as changed when the differences in color or grey level of corresponding sub-image blocks are greater than a pre-determined threshold. In some embodiments the differences in color or grey level for each sub-image block for each image pair in the collection of images are compared to a pre-determined threshold. If the sub-image block is considered changed then the pixels within that sub-image block are also considered changed. Sub-image blocks corresponding to pixels which are not labeled as background pixels in the background image are labeled as "unknown". In one embodiment, sub-image blocks labeled as "unknown" are considered as un-changed.

In block 107 the process associates changes. In one embodiment, associating changes comprises detecting changes between an image and the estimated and/or validated background image, determining connected regions of changed pixels (ROCH) in the image and linking or associating the ROCH to other ROCHs that have similar properties, in other images from the collection of images. A temporally connected region of change (TC-ROCH) is a collection of ROCHs that have similar properties in more than one image. For example if a ROCH exists in an image or frame i (where i is an integer) and another ROCH exists in image or frame i+k (where k is an integer), and the ROCH and the other ROCH have, in various embodiments, similar size or similar position, or both similar size and position, then these two ROCHs are considered to correspond to the same object and they are grouped together forming a TC-ROCH.

In block 109 the process classifies associated changes. In one embodiment, classifying associated changes comprises classifying associated changes by shape and or size. For example, people and cars in images may be distinguished by shape and/or size of their TC-ROCHs. In addition or instead, other criteria for classification may be used for example color, velocity or acceleration (or vector components of velocity or acceleration) with respect to image pixel coordinates or, if photogrammetric information is available, actual velocity or acceleration.

The TC-ROCHs may be indexed in memory or a database, which also may be in memory, by its classification. In block 111 the process saves parameters. The parameters may be classifications of ROCHs or TC-ROCHs or indicative of classifications of ROCHs or TC-ROCHs. In one embodiment, saving parameters comprises saving, or storing the parameters into a memory, for example in a format allowing for search and/or retrieval. In one embodiment, the parameters stored in memory are stored in or with respect to a hierarchical data model, such as a tree structure. In one embodiment, the tree structure may be populated with data structures containing fields which represent or relate to the parameters. In another embodiment, the parameters stored in memory are stored in or with respect to a list structure. In one embodiment, the list stricture may comprise data structures containing fields which represent or relate to saved parameters. In some embodiments the parameters are saved in a relational database.

Figure 2:
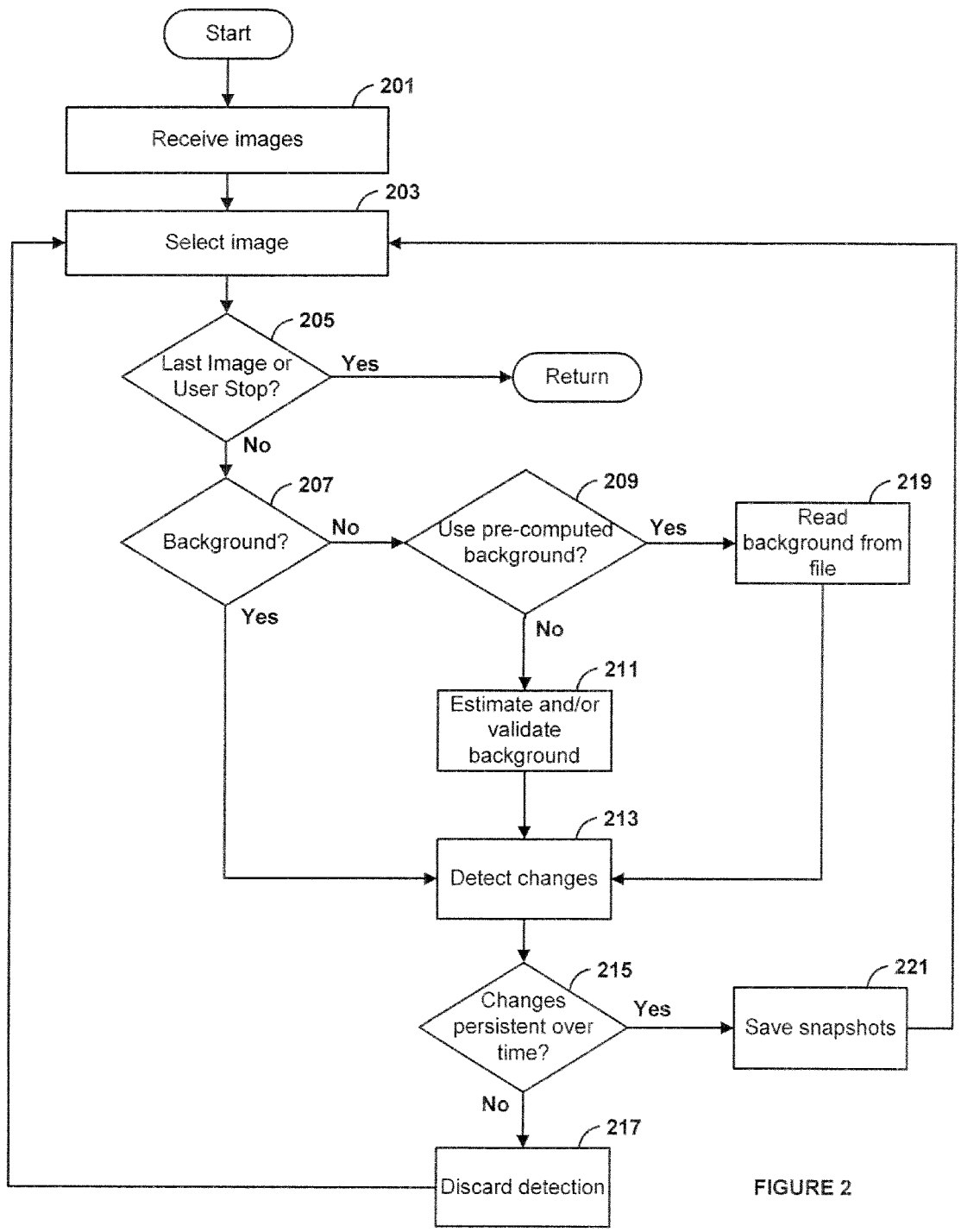
FIG. 2 is a flow diagram of a method showing one aspect of the present invention, for obtaining a snapshot movie.

A ROCH snapshot picture or a ROCH snapshot is a picture or image displaying one individual ROCH. A snapshot movie is a sequence of pictures or images displaying all the regions of change in a TC-ROCH. FIG. 2 shows a logic flow diagram of a process for obtaining a snapshot movie. In block 201 the process receives images. Block 201 is an optional block and is not required for the process. In some embodiments operation of block 201 is similar to or the same as operation of block 101 of the process of FIG. 1. In block 203 the process selects an image. In one embodiment selecting an image comprises choosing a image from a collection of images stored in a memory. In block 205 the process determines if the image selected in block 203 is the last image in the collection or if the user stopped the process. In one embodiment determining whether the image selected is the last image comprises determining which images have been processed by the process in FIG. 2, and if the image selected has not been processed by the process in FIG. 2 then continuing with the process. In another embodiment if the user stops the process by some action by the user such as exiting the process then the process returns otherwise the process continues with the selected image.

In block 207 the process determines if a background should be determined. In one embodiment, determining if a background should be determined is a function of the number of images processed. For example the background may be estimated every 5 images. Thus, for every 5 images a new background should be determined. In other embodiments, determining whether a background should be determined is a function of time. For example, the background may be estimated for every 60 seconds worth of images. In other embodiments a background may not exist and thus a background should be determined. If the process determines that a background should be determined in block 207 then the process branches to (No) and continues with block 209.

In block 209 the process determines whether the background should be estimated or whether a pre-determined background should be used. If the process determines that a pre-determined background should be used then the process branches to (Yes) and continues with block 219. In block 219 pre-determined background is read from a file. If in block 209 the process determines that a background should be estimated then the process branches to (No) and continues with block 211. In block 211 the process estimates a background. In many embodiments operation of block 211 is similar to or the same as operation of block 103 of the process of FIG. 1.

In block 213 the process detects changes between the images in the collection and the background image. In many embodiments operation of block 213 is similar to or the same as operation of block 105 of the process of FIG. 1. In block 215 the process associates the detected changes or determines if the changes are persistent over time. In many embodiments operation of block 215—is similar to or the same as operation of the block 107 of the process of FIG. 1. In block 221 if the changes are persistent over time then a TC-ROCH exists and its associated snapshots are saved. If the changes detected in block 215 are not persistent over time then a TC-ROCH does not exist and the detection of the changes, the ROCHs, are discarded in block 217. Several TC-ROCHs may exist simultaneously in the same images. The process loops back to select another image again in block 203 and the process repeats until the user stops the process or until the last image is processed. Once the process is complete the collection of snapshots make up a snapshot movie. Information about the snapshot movie may be stored in a database and later retrieved. For example, data classifying the various TC-ROCHs (e.g. automobiles) may be stored so that later automobile information may be retrieved.

Figure 3:
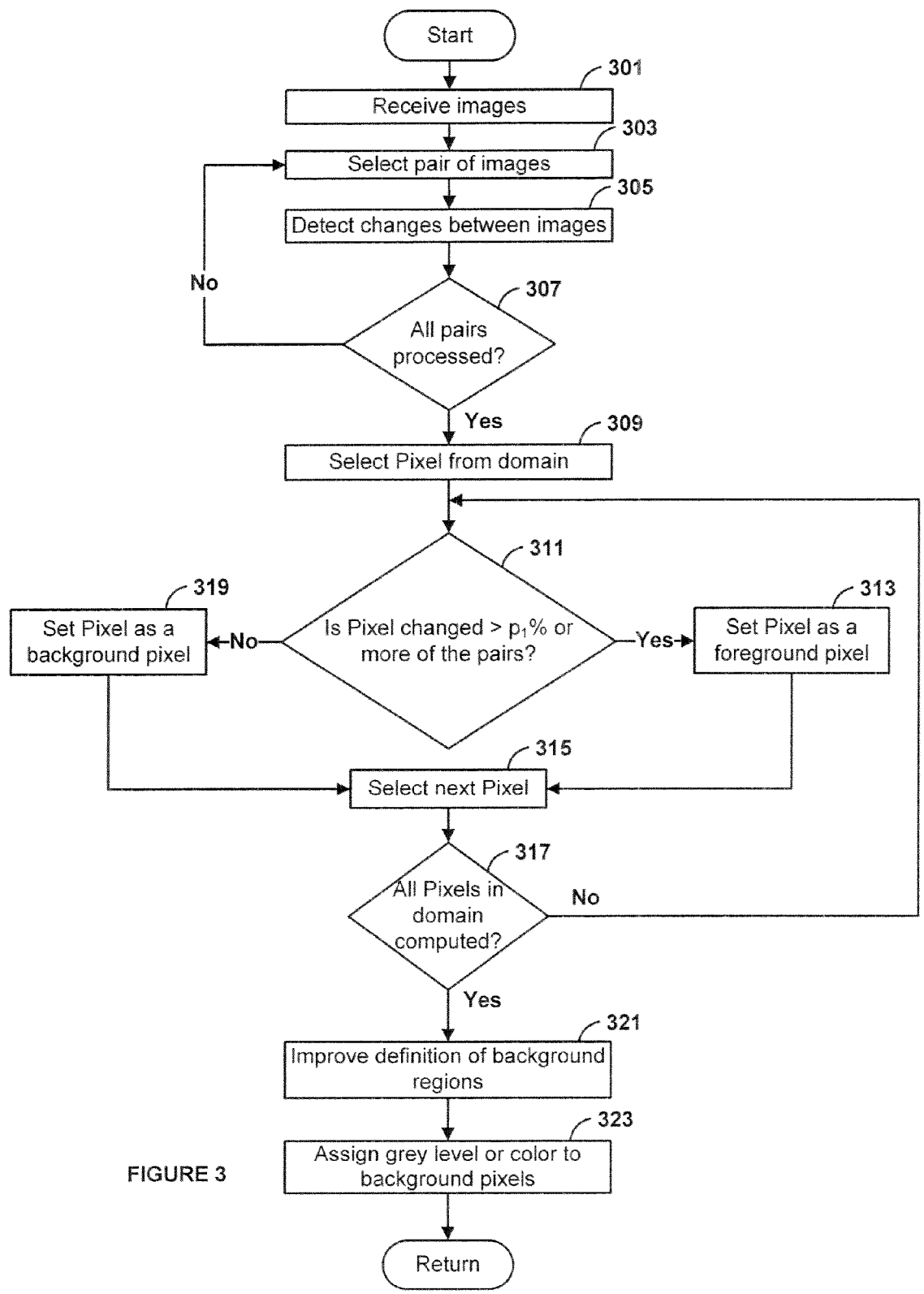
FIG. 3 is a flow diagram of a method showing one aspect of the present invention for estimating the background.

FIG. 3 shows a flow diagram of one embodiment of a process for estimating a background. In some embodiments the process or portions of the process of FIG. 3 is used to perform the operations, functions, or methods of blocks 103 and 211 related to background estimation. In block 301 the process receives images. Block 301 is an optional block In block 303 the process selects a pair of images. In one embodiment, selecting a pair of images comprises choosing a pair of images from a collection of images stored in a memory. In some embodiments operation of block 301 is similar to or the same as operation of block 103 of the process of FIG. 1. For example, the process may choose an image a and on image b, which are a pair of images. In one embodiment images that are T seconds apart in a video sequence are selected (for example, T=60 seconds). In another embodiment images that are N images apart in a video sequence are selected (for example. N=500).

In block 305 the process detects changes between the images. In one embodiment detecting changes between the images comprises subdividing a pair of images into sub-image blocks, determining the difference in color or grey level between corresponding sub-image blocks in both images, and considering the sub-image block as changed when the differences in color or grey level are greater than a pre-determined threshold. If the sub-image block is considered changed then the pixels within that sub-image block are also considered changed.

In block 307 the process checks whether all of the image pairs have been processed. If all of the image pairs have not been processed, then the process loops back and repeats starting at block 303. If all of the image pairs have been processed, then the process continues with block 309. A common spatial domain or domain is when corresponding pixels in each of the images, in a collection of images, have the same spatial coordinates within their images. In block 309 the process selects a pixel from a domain. In one embodiment, selecting a pixel from the domain comprises knowing that all of the images are of the same size and perfectly registered. If there is a registration error, then further processing may be utilized to correctly register the images and to compute the domain, for example as is knows in the art. The embodiment further comprises selecting a pixel (i,j) where i and j are integers, from the domain. In block 311 in one embodiment, if the pixel (i,j) is marked as changed in $p_1$% or more of the pairs of images, the process continues to block 313. Alternatively, if the pixel (i,j) is marked as changed in less than $P_1$% of the pairs of images, then the process continues to block 319. In block 313 the process sets the pixel as a foreground pixel. In block 319, the process sets the pixel as a background pixel.

In block 315 a next pixel in the domain is selected. In block 317 the process checks if all of the pixels in the domain have been processed. If there are remaining pixels in the domain to be processed, then the process loops back to block 311. In block 321 the process improves the definition of background regions by filling holes and gaps in these regions. In one embodiment holes and gaps are filled in by using a morphological dilation/erosion scheme, for example as is known in the art. In block 323 a color or grey level is assigned to the background pixels. In one embodiment the pixel color is computed as the average value of the colors of the image pairs where the pixel is marked as unchanged. In another embodiment the pixel grey level is computed as the average value of the grey levels of the image pairs where the pixel is marked as unchanged. Non-background pixels are labeled as "non-background" and this information is saved. In one embodiment, color of non-background pixels color is set to black (0 value for the grey level anchor color channels).

Figure 4:
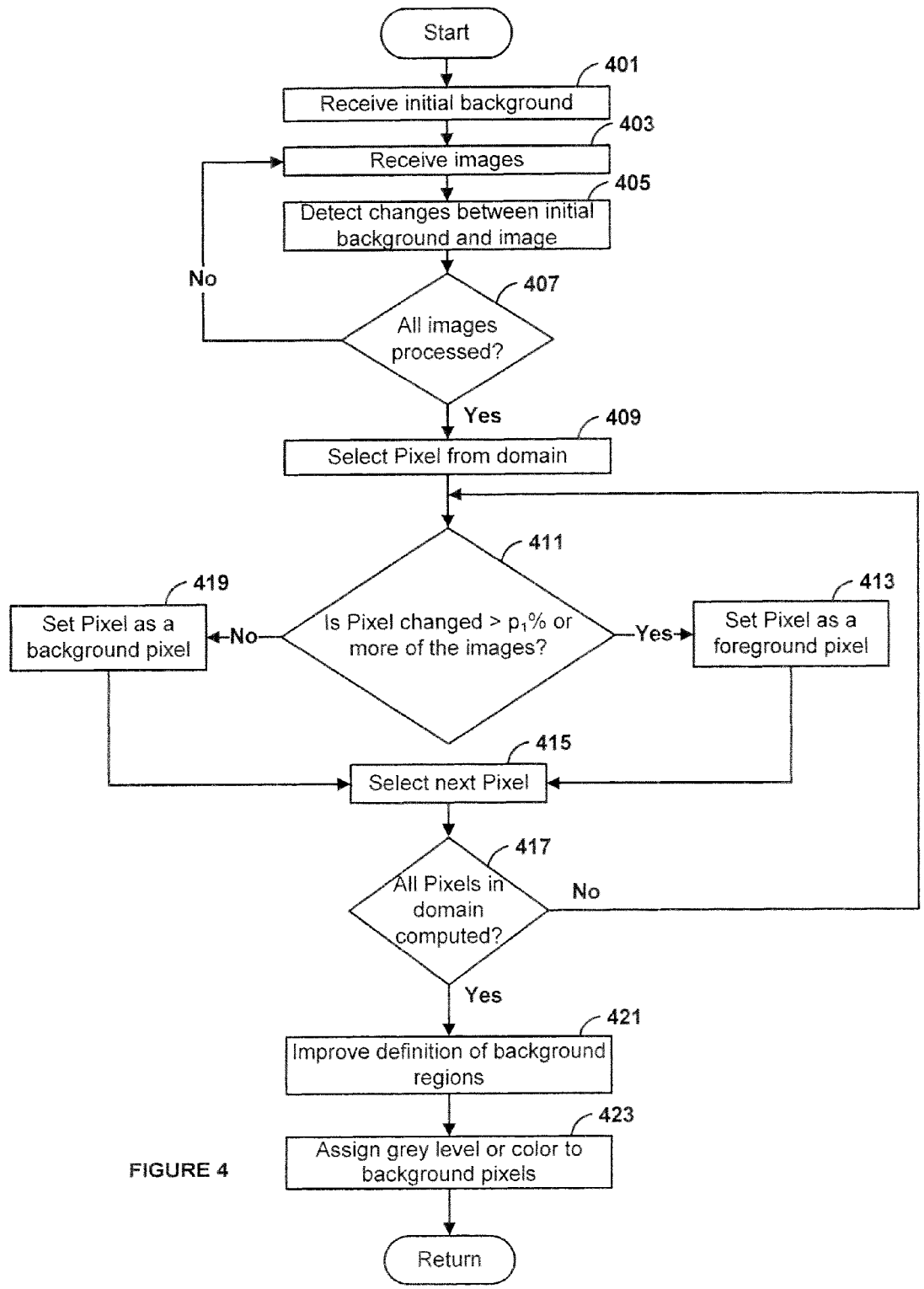
FIG. 4 is a flow diagram of a method showing one aspect of the present invention, for validating the background.

FIG. 4 is a flow diagram of one embodiment of a process for validating a background. In some embodiments the process or portions of the process of FIG. 4 is used to perform the operations, functions, or methods of blocks 103 and 211 related to background validation. In block 401 the process receives a background image (input background image or initial background image) which is to be validated. In block 403 the process receives images. Block 403 is an optional block and is not required for the process. In block 405 the process detects changes between the image and the initial background. In block 407 the process checks whether all of the images have been processed. If all of the images have not been processed, then the process loops back and repeats starting at block 403. If all of the images have been processed, then the process continues with block 409. Block 409 is similar to block 309 and will not be discussed further. In block 411, in one embodiment, if the pixel (i,j) is marked as changed in $p_1$% or more of the images, the process continues to block 413. Alternatively, if the pixel (i,j) is marked as changed in less than $p_1$% of the images, then the process continues to block 419. In block 413 the process sets the pixel as a foreground pixel. In block 419, the process sets the pixel as a background pixel. In block 415 the next pixel in the domain is selected. In block 417 the process checks if all of the pixels in the domain have been processed. If there are remaining pixels in the domain to be processed, then the process loops back to block 411. In block 421 the process improves the definition of background regions by filling holes and gaps in these regions. Block 421 is similar to block 321 and will not be discussed further. In one embodiment holes and gaps are filled in by using a morphological dilation/erosion scheme as is known in the art. In block 423 a color or grey level is assigned to the background pixels of the final output background image. In one embodiment the pixel color is computed as the average value of the colors of the image where the pixel is marked as unchanged. In another embodiment the pixel grey level is computed as the average value of the grey levels of the images where the pixel is marked as unchanged. Non-background pixels are labeled as "non-background" and this information is saved. In one embodiment, non-background pixels color is set to black (0 value for the grey level and or color channels).

Figure 5:
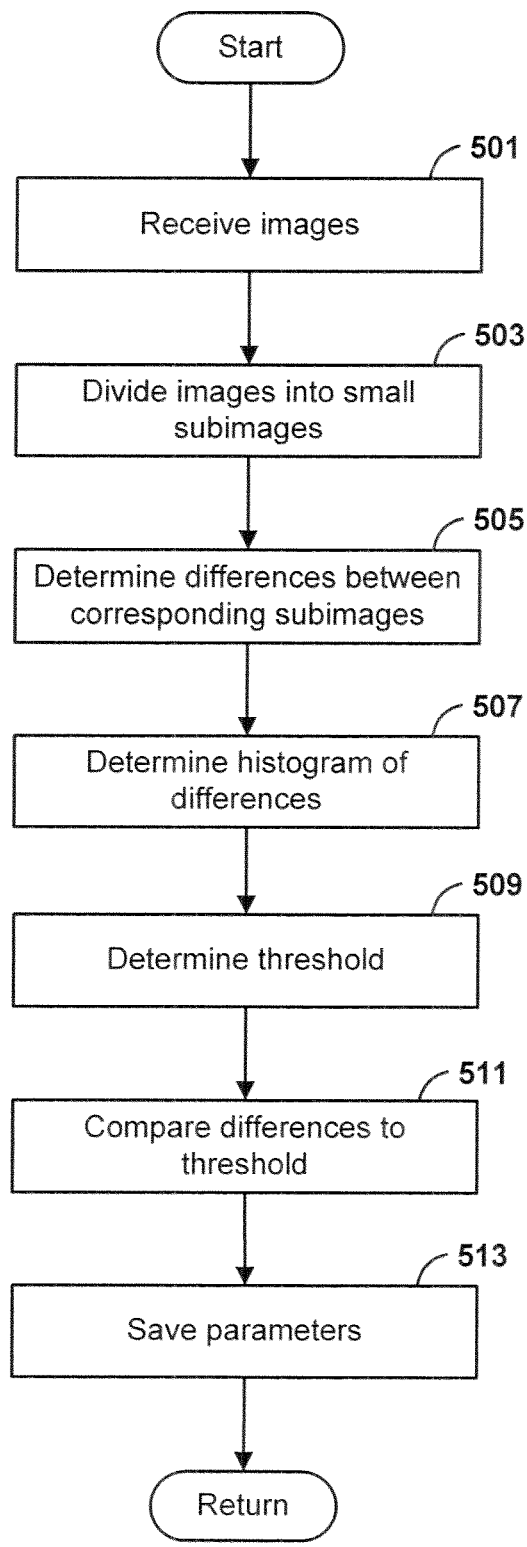
FIG. 5 is a flow diagram of a method showing one aspect of the present invention, for detecting changes in images.

FIG. 5 is a flow diagram of one embodiment of a process for detecting changes in images. In some embodiments, the process or portions of the process of FIG. 5 is used to perform the operations, functions or methods of blocks 105, 213, 305 and 405. In block 501 the process receives images. For example, the process may receive a background image and an image from a collection of images. In block 503 the process subdivides each of two of the image into sub-image blocks. In one embodiment, the spatial domain is subdivided into blocks of size $w_s \times w_s$, where $w_s$ is a number of pixels (e.g. $w_s=5$ pixels). Then the corresponding sub-image blocks in the two images are used in the process. In block 505 the process determines the differences between corresponding sub-image blocks. In one embodiment, determining the differences between corresponding sub-image blocks comprises determining the difference or degree of similarity of color or grey level between corresponding sub-image blocks in both image images. In this embodiment, the color or grey level difference may be expressed as in equation [1]

$$d_B = \Sigma d_{ij}/N \quad [1]$$

where (i,j) is the index of the pixel in the block; N is the number of pixels in the block and $d_{ij}=\max\{d_{ij}^R, d_{ij}^G, d_{ij}^B\}$; where $$d_{ij}^R = \min_{-s \leq r \leq s}\{|R^1(i,j)-R^2(i-r,j-r)|\}$$

$$d_{ij}^G = \min_{-s \leq r \leq s}\{|G^1(i,j)-G^2(i-r,j-r)|\}$$

$$d_{ij}^B = \min_{-s \leq r \leq s}\{|B^1(i,j)-B^2(i-r,j-r)|\}$$

where s is small, typically s=0 and where $R^k, G^k, B^k$ are the R, G, and B channels of image k; and where k is an integer representing the image index number.

For grey level images $d_{ij}=\min_{-s \leq r \leq s}\{|I^1(i,j)-I^2(I-r,j-r)|\}$, where s is small typically s=0; and where $I^k$ is the intensity of image k; and where k is an integer representing the image index number. The use of s>0, in the equations above, provides some robustness to the process in the case of misregistration of the input images.

In block 507 the process determines a histogram of differences. In one embodiment, determining a histogram of differences comprises determining a histogram of difference values ($d_B$) and computing its most meaningful interval starting at zero for example as is knoll in the art. A meaningful interval of a histogram is an interval containing a proportion of values statistically significantly above (or below) an expected proportion. In one embodiment, the expected proportion corresponds to a uniformly distributed histogram. Call S the set of sub-image blocks contributing to the most meaningful interval. In block 509 the process determines the threshold value. In one embodiment, the threshold value D is determined by using the mean and variance of $d_B$ for the blocks in S in combination with the Chebyshev formula. The threshold value of $d_B$ is computed such that the probability for an unchanged block having $d_B$ larger than D is smaller than p % (typically p=1). According to the Chebyshev formula $P(|X-\mu| \geq \lambda) \leq \sigma^2/\lambda^2$, where X is the distribution of $d_B$ values in S; $\mu, \sigma^2$ are the mean and variance of X. Compute the threshold D by first defining $\lambda_p$ as the value of lambda such that $\sigma^2/\lambda_p^2 = p$; and $$P(X-\mu \geq \lambda) \leq P(|X-\mu| \geq \lambda), \text{ therefore}$$

$$P(X \geq \mu + \lambda_p) \leq \sigma^2/\lambda_p^2 = p, \text{ then}$$

$$D = \mu + \lambda_p = \mu + \sigma/\sqrt{p} \quad [2]$$

In block 511 the process compares the differences de to the threshold $d_B$ to determine whether a sub-image block may be considered as meaningfully changed. In one embodiment comparing the differences $d_B$ to the threshold $d_B$ comprises evaluating whether $d_B > D$. This criterion ensures that at most p % of the unchanged sub-image blocks will be misclassified as changed. In block 513 the process saves parameters. In one embodiment, saving parameters comprises saving, or storing parameters, such as the $d_B$ values, sub-image block index numbers, image numbers, threshold values and threshold comparison results, previously computed into a memory or database.

Figure 6:
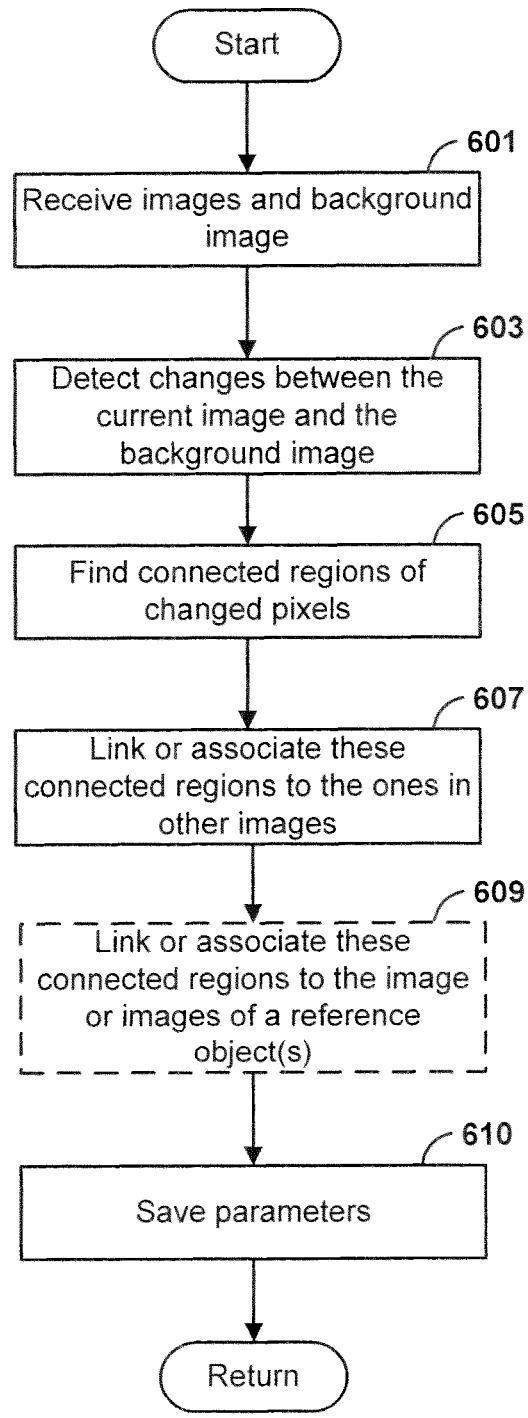
FIG. 6 is a flow diagram of a method showing one aspect of the present invention, for creating ROCHs and optionally associating them to ROCHs in other images.

FIG. 6 is a flow diagram of one embodiment of a process for creating ROCHs and associating or inking ROCHs in images (e.g. one or more images) to other ROCHs in other images (e.g. one or more images). In some embodiments, the process or portions of the process of FIG. 6 is used to perform the operations, functions, or methods of blocks 107 and 215. In block 601 the process receives a collection of images and a background image. In one embodiment, receiving images and a background image comprises receiving images into a memory. In another embodiment receiving images and a background image comprises knowing where those images are located. In block 603 the process detects changes between the current image and the background image. In one embodiment, detecting the changes between the current image and the background image comprises performing the process or portions of the process described in FIG. 5. The current image is the image from a sequence or collection of images that the process is currently processing. Block 603 is an optional block in the process. In block 605 the process determines connected regions of changed pixels. In one embodiment determining connected regions of changed pixels comprises determining regions of changed pixels (e.g. using 4-connectivity) as is known in the art. These regions of changed pixels are also called ROCHs. In one embodiment, holes and gaps of these ROCHs are filled in by using a morphological dilation/erosion scheme, as is known in the art. In block 607 the process links or associates these connected regions of changed pixels or ROCHs to other ROCHs in other images (e.g. previous images or image or images of a reference object). Block 607 is an optional block in the process. In one embodiment linking ROCHs between images comprises: for example, given a ROCH A in image i, ROCH B in images i−1, i−2M, . . . , i−M (where M is an integer, typically M=1) is a valid candidate for linking if (1) ROCH A and ROCH B have similar size, (2) ROCH A and ROCH B appear at similar positions in the scene (e.g. the distance between their barycenters is smaller than some threshold, or the intersection between the ROCHs is non-empty). Once linking occurs for ROCH A and ROCH B it may be referred to as a temporally connected region of changed pixels (TC-ROCH). In another embodiment, associating or linking ROCHs between images or images of reference objects comprises comparing geometrical features such as pieces of level lines, level sets, edges, matching points, matching neighborhoods, or any other matching registration method known in the art. In optional block 609, the process links or associates ROCHs with image(s) of a reference object(s) using methods similar to or the same as those described above in block 607. An image of a reference object may be for example an image of a vehicle, person, clothing, place, thing. ROCH from any random image or any other specific object of interest that may be in any image. In block 610 the process saves parameters. In one embodiment, saving parameters comprises saving, or storing each of the parameters previously computed into a memory. In another embodiment saving parameters comprises saving each of the parameters previously computed into a database so that the information may be later retrieved easily.

Figure 7:
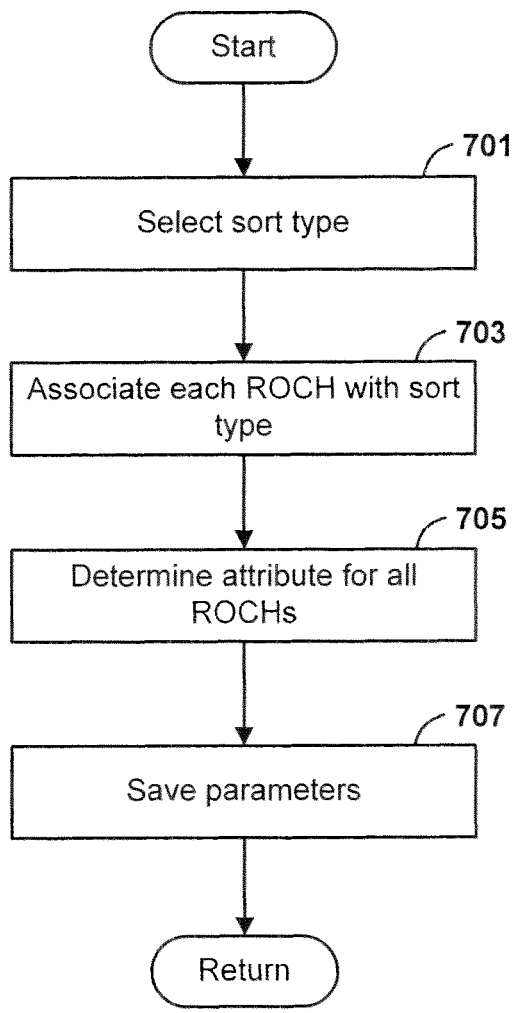
FIG. 7 is a flow diagram of a method showing one aspect of the present invention, for classifying detected changes.

FIG. 7 is a flow diagram of one embodiment of a process for classifying detected changes. In some embodiments, the process of FIG. 7 is used to perform the operations, functions, or methods of block 109. In block 701 the process selects the sort type. In some embodiments selecting the sort type comprises selecting an attribute that may be used to sort out the TC-ROCHs or ROCHs. For example a sort type might be size, color grey level, human face, automobile make, type of clothing temporal event, or any other classification that is known in the art. In block 703 the process associates each ROCH or TC-ROCH with the sort type. In one embodiment associating each ROCH or TC-KOCH with the sort type comprises associating to each pixel in a given ROCH or TC-ROCH the closest palette color when the sort type is color. In block 705 the process determines the attribute for each ROCH or TC-ROCH. In one embodiment determining the attribute for each ROCH or TC-ROCH comprises finding the dominant color in each ROCH or TC-ROCH. For example finding the dominant color in a representative ROCH of the TC-ROCH may comprise selecting the first ROCH in the TC-ROCH such that it does not meet the border of the image. Defining a color palette such as a color palette of 9 colors. The color palette may be composed of 6 saturated colors (red, green, blue yellow, magenta and cyan) and 3 non-saturated colors also called 'greys' (white, grey, and black). Each color in the palette is defined by a unique RGB value (e.g. red=(255,0,0)). Associating each pixel in the representative ROCH to one or several colors in the palette. For example, the RGB color value of the pixel is first converted to HIS (hue, saturation, and intensity) by using conversion formulas as is known in the art. If the saturation value is below some threshold (e.g. 15) then the pixel is associated to a non-saturated color in the palette. If the saturation value is above some threshold (e.g. 30) then the pixel is associated to a saturated color in the palette. If the saturation value is between these two thresholds then the pixel is associated both to a non-saturated color and to a saturated color. In any of these cases the association is with the color in the palette (either non-saturated, saturated or both) closest to the pixel color (smallest Euclidean distance between RGB values). Computing the percentage of pixels in the representative ROCH associated to each color in the palette. Order the colors in the palette in decreasing order according to this percentage. The dominant colors of the TC-ROCH are the first M (where M is an integer) colors in the ordered list such that the sum of their percentages is above a given threshold (e.g. 50%). For example if a representative ROCH contains 40% red, 25% blue, 15% white, 10% grey, 5% black, and 5% yellow. The dominant colors are red and blue since 40%+25%=65%>50%. In another embodiment, if size were the sort type then comparing the size to a particular threshold may determine the ROCH or TC-ROCH attribute such as a car or person. In block 707 the process saves parameters. In one embodiment, saving parameters comprises saving or storing each of the parameters previously computed into a memory. In another embodiment saving parameters comprises saving each of the parameters previously, such as TC-ROCH or ROCH attribute, computed into a database so that the information may be later retrieved easily.

TC-ROCHs may be retrieved from a database of TC-ROCHs based on any attributes. In one embodiment the retrieval may be based on several colors of the color palette. For example, a user may select one or more colors in the palette described above. The retrieved TC-ROCHs are those whose dominant colors are among the ones selected by the user. In another embodiment, TC-ROCHs may be retrieved based on an arbitrary color. For example, a user may select one or more arbitrary colors from an image or from a color palette different to the color palette used in the database of TC-ROCHs. The color is added to the existing color palette. Each pixel in the representative ROCH for each TC-ROCH in the database is re-associated to one or several colors in the augmented color palette. An ordered list of dominant colors is determined similar to the method above for each representative ROCH for each TC-ROCH in the database. The retrieved TC-ROCHs are those whose dominant colors are among the ones selected by the user.

The present invention may be used for event detection. For example, in one embodiment, the process described in FIG. 3 or 4 may be used to estimate and/or validate a background image. The process described in FIG. 3 or 4 may be repeated for a collection of images corresponding to a different time period. Using the process of FIG. 5, detect changes in the background images from the different time periods. This method just described may be used to detect unusual events occurring in the background.

The TC-ROCHs may be modified. For example the ROCHs detected by the process described in FIG. 6 may be processed according to several criteria. For example, in one embodiment, once the connected regions are linked as in block 607 then we may add an extra step and modify the pixels in all of the ROCHs making up the TC-ROCH to for example obscure the all of the ROCHs so that a user may not be able to view the ROCHs or the TC-ROCH. This technique may be used to obscure the face of a person or to hide an object.

Figure 8:
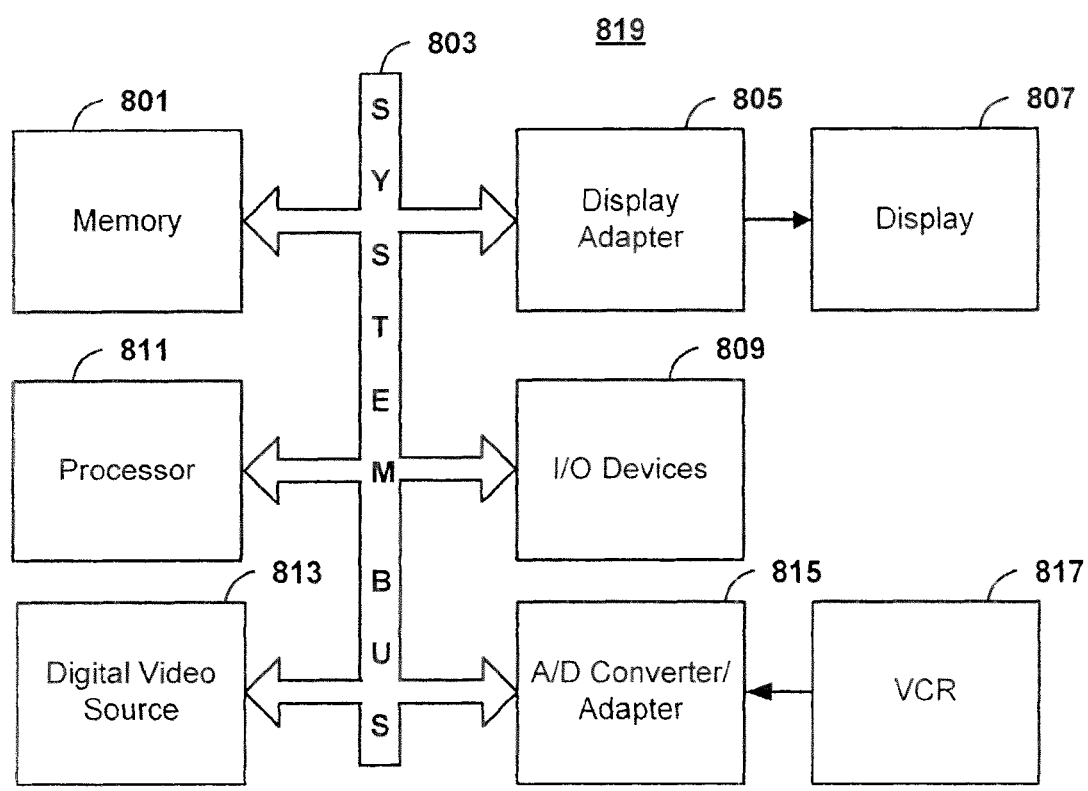
FIG. 8 is a block diagram showing one aspect of the present invention depicting a general purpose computing device constituting an exemplary system for implementing the present invention.

With reference to FIG. 8, 819 is a general purpose computing device in the form of a conventional personal computer, including a processing unit 811, a system memory 801, and a system bus 8003 that couples various system components including the system memory to the processing unit 811. The system bus 803 may be of any type commonly known in the art of personal computers and motherboard design. In one embodiment, the system bus 803 is any medium or structure used for transferring information from one element to another such as transferring image information from any one of the I/O Devices 809 to the memory 801. An example and one embodiment of a system bus 803 that is in common use today is the PCI bus. The system memory 801 may contain read only memory (ROM) and/or random access memory (RAM) both not shown in FIG. 8. The system memory 801 may also contain the basic input/output system (BIOS), containing the basic routine that helps transfer information between elements within the personal computer 819, such as during start-up, may be stored in ROM. The BIOS is not shown specifically in FIG. 8. The I/O Devices 809 comprises common personal computer interface devices such as a hard disk drive for reading from or writing to a hard disk, a magnetic disk drive for reading from or writing to a removable magnetic disk, an optical disk drive for reading from or writing to a removable optical disk such as a CD-ROM or other optical media, a keyboard for use as an input device, a pointing device such as a mouse, joystick or trackball for inputting commands to the computer. Other I/O devices 809 (not shown specifically) may be used with the personal computer 819 such as a microphone, game pad, satellite dish, scanner, and digitizing tablet. These input devices may be connected to the computer via universal serial bus (USB), serial port IEEE 1394 or other proprietary interfaces such as PICT. Other I/O Devices 809 include a camera such as a digital camera, a video camera or any optical device, capable of capturing an image or a sequence of images may also be an I/O Device to the personal computer 819. The camera interface portion may be a USB interface, memory card or it may be a proprietary interface. For each type of camera interface, the camera and the camera interface are capable of transferring information about images or sequence of images from the camera to the personal computer 819. The I/O devices interface 809 is coupled to the system bus 803 allowing the images or sequence of images from any I/O device to be routed to and stored in the memory 801 or any other data storage device accessed via a I/O device interface 809 associated with the personal computer 819. Images or sequence of images (hereinafter referred to as data) may also be contained on other computer readable media such as a removable magnetic disk, removable optical disk, flash card, memory key, random access memory, read only memory, memory stick or a host of commonly available computer readable media. Data stored on computer readable media may not require the use of the camera. A digital video source 813 such as a digital movie camera or a digital recorder is coupled to the system bus 803 allowing the images or collection of images to be routed to and stored in the memory 801 or any other data storage device accessed via a I/O device interface 809 associated with the personal computer 819. A VCR 817 is coupled to the system bus 803 via an A/D converter adapter 815 allowing the images or collection of images to be routed to and stored in the memory 801 or any other data storage device accessed via a I/O device interface 709 associated with the personal computer 819. A display 807 is also connected to the system bus 803 via a display adapter 805. Other devices that may be connected to the personal computer 819 but are not shown are printers, facsimiles, internal modems, and controller cards. These devices may also be connected to the computer via the I/O Devices 809.

The personal computer 819 may operate in a networked environment using one or more connections to one or more remote computers or devices (not shown). The remote computer may be a similar personal computer, a server, a router, a network PC, a peer device, a hand-held device, a camera, a cellular handset, a cash register, a printer, a storage device, a facsimile, or any other device capable of communicating with the personal computer in a networked environment. The I/O devices 809 interface on the personal computer comprises methods for performing communications in a networked environment. In one embodiment, the I/O device 809 comprises an Ethernet card or modem. In one embodiment the networked environment may be a local area network (LAN) or wide area network (WAN). These types of networked environments are common in offices, intranets, and the Internet.

Figure 9:
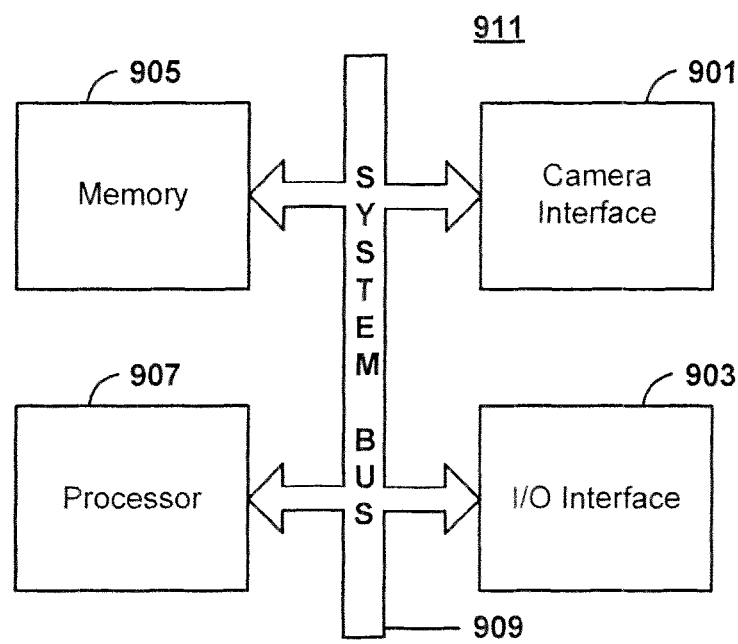
FIG. 9 is a block diagram showing one aspect of the present invention depicting an embedded system constituting an exemplary system for implementing the present invention.

FIG. 9 depicts one embodiment of an embedded system 911 for implementing the present invention. In one embodiment this embedded system 911 may be specifically designed to perform the present invention. In other embodiments, the embedded system 911 may perform other functions in addition to the present invention. The embedded system 911 may be included in a handheld device, included in an automobile, included in a cash register, included in a photo printer or printer, included in a raster image processor (RIP), included in a facsimile machine, included in a kiosk, included in a camera, included in a video camera, included in router, included in a database, included in a security system, included in a digital VCR, included in a digital recorder or included in any standalone or integrated device. In some embodiments such as just described, the elements of 911 may be shared with the hosting device. For example, if 911 is included in a digital VCR then processor 907, memory 905, optional camera interface 901 and optional I/O interface 903 may be shared with the digital VCR functions. Additionally, in this example, the digital VCR may have additional elements (not shown) coupled to the system bus 909 to perform the additional digital VCR functions. This embedded system contains a processor 907, memory 905, a system bus 909, a camera interface 901, and a general input/output (I/O) interface 903. The camera interface 901 and the I/O interface 903 are both optional. Each of the elements is coupled through the system bus 909 to the processor 907. The processor 907 may be a microprocessor, microcontroller, application specific integrated circuit (ASIC), field programmable gate array (FPGA), image processor, any type of processor capable of processing program instructions, or any type of integrated circuit (IC) capable of being programmed to perform the methods of the present invention. The system bus 909 is any type of system bus that is commonly known in the art of embedded system design. A camera (not shown) such as a digital camera, a video camera or any optical device, capable of capturing an image or a collection of images may be connected to the camera interface 901. The images from the camera are input to the embedded device 911 via the camera interface 901. The camera interface 901 may be a USB interface, an interface capable of transferring images to the embedded system or it may be a proprietary interface. For each type of camera interface 901, the camera (not shown) and the camera interface 901 are capable of transferring information about images or sequence of images from the camera interface 901 to the embedded device of FIG. 9. The camera interface 901 is coupled to the system bus 909, allowing the images or sequence of images from the camera (not shown) to be routed to and stored in the memory 905. The memory 905 may be any combination of RAM, ROM, programmable read only memory (PROM), electronically programmable read only memory (EPROM), and flash memory or any of these equivalents. The memory 905 may be permanently wired to the embedded system 911 or it may be removable. An example of a removable memory is a memory that can be removed and replaced by human hand or tool such as a memory stick. The I/O interface 903 may be any type of interface that can communicate with devices. In one embodiment the I/O interface 903 is a USB type interface. In another embodiment, the I/O interface 903 can be IEEE 1394. The I/O interface 903 is optional thus, for an embedded system 911, the I/O interface 903 will only be present if required by the embedded system.

Figure 10:
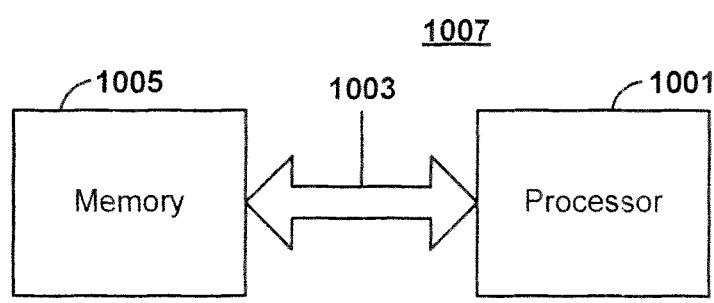
FIG. 10 is a block diagram showing one aspect of the present invention depicting a limited number of components in an embedded system constituting an exemplary system for implementing the present invention.

FIG. 10 is another diagram of one embodiment of an embedded system 1007 for implementing the present invention. The embedded system 1007 contains only a processor 1001, a system bus 1003, and a memory 1005. The embedded system 1007 is one embodiment used to show that minimal elements are required to perform the methods of the present invention. The embedded system 1007 may be included in a handheld device included in an automobile, included in a cash register, included in a photo printer or printer, included in a raster image processor (RIP), included in a facsimile machine, included in a kiosk, included in a camera, included in a video camera, included in router, included in a security system, included in a digital VCR, included in a digital recorder, included in a database or included in any standalone or integrated device. The processor 1001 is similar to or the same as the processor 907. The system bus 1003 is similar to or the same as the system bus 909. The memory 1005 is similar to or the same as the memory 905.

Figure 11:
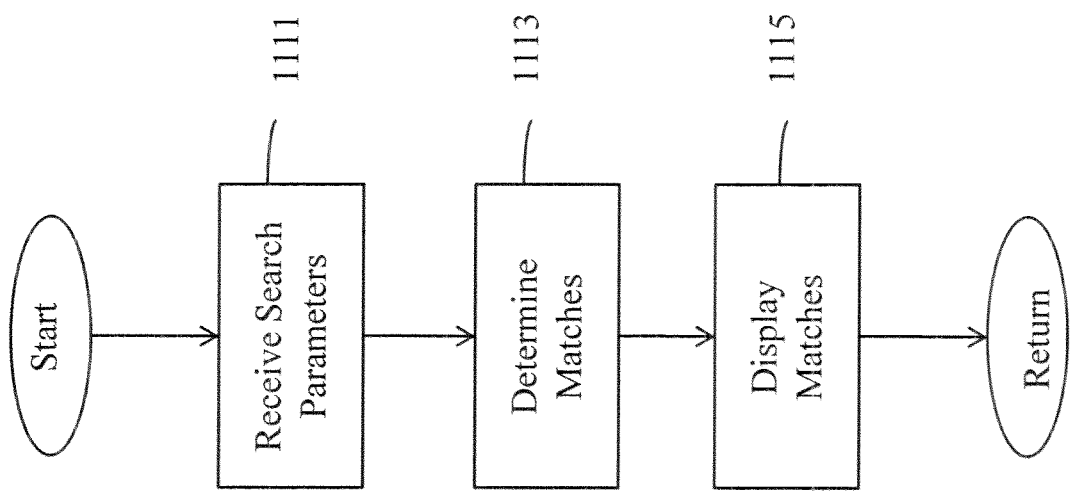
FIG. 11 is a flow diagram of a process for providing information of images showing moving objects with specified characteristics.

FIG. 11 is a flow chart of a process for providing information of images showing moving objects with specified characteristics. In one embodiment, the images are a collection of images comprising digitally formatted images, for example images in JPEG format. In some embodiments, the collection of images comprises a sequence of moving images or video frames such as a digital movie in other formats. Some examples of common digital movie formats include MPEG, WMV, AVI, or DiVX. In some embodiments, the method is performed by a system or device later discussed with respect to FIGS. 8-10.

In block 1111, the process receives search parameters. In one embodiment, search parameters may be parameters as discussed with respect to the process of FIG. 2. Some examples of parameters are classifications of ROCHs and TC-ROCHs. In one embodiment, the search parameters comprises classifications of characteristics relating to an object in an image, such as color, shape, or size. In other embodiments, search parameters comprises classifications of position of movement relating to an object. Some examples of classifications of movements are velocity or acceleration, or vector components of velocity or acceleration, with respect to pixel coordinates or, if photogrammetric information is available, actual velocity or acceleration. In other embodiments search parameters comprises a combination of classifications of ROCHs and TC-ROCHs. For example, assuming photogrammetric information is available, search parameters may indicate a classification for a red circle moving at a velocity of 25 miles per hour.

In block 1113 the process determines if the search parameters match any saved parameters. In some embodiments, parameters are saved and indexed as images are received and classified as discussed with respect to FIG. 1. In one embodiment, saved parameters comprises parameters previously saved into memory, such as classifications of ROCHs and TC-ROCHs. In one embodiment, saved parameters are stored in memory of devices for example described with respect to FIGS. 8-10. In another embodiment, saved parameters are stored in a database which may be stored in memory. In some embodiments, search parameters are compared with saved parameters to determine whether there are any matches. For example, if the search parameters provide for a classification indicating a red circle moving at a velocity of 25 miles per hour and there is a classification it memory or in a database indicating a red circle moving at a velocity of 25 miles per hour, the process will determine that there is a match.

In block 1115 the process displays all or a set of matching classifications of ROCHs and TC-ROCHs. The process thereafter returns.

Aspects of the invention therefore provide for image information classification, searching, and image retrieval. Although the invention has been discussed with respect to specific embodiments, it should be recognized that the invention comprises the novel and unobvious claims supported by this disclosure and their insubstantial variations.

The invention claimed is:

1. A method comprising:
  receiving a plurality of images into a memory;
  for each pair of a plurality of pairs of the plurality of images:
    determining color level differences between one or more corresponding sub-image blocks; and
    determining whether at least one of the one or more corresponding sub-image blocks is considered changed based at least in part on statistics of the color level differences for two or more corresponding sub-image blocks in the pair; and
  setting at least one of the one or more corresponding sub-image blocks as a foreground sub-image block or a background sub-image block based on a number of changes determined for the corresponding sub-image block.

2. The method of claim 1, wherein at least one of the one or more corresponding sub-image blocks is set as foreground sub-image blocks if the number of changes determined for the at least one of the one or more corresponding sub-image blocks is greater than a threshold percentage of a total number of the plurality of pairs.

3. The method of claim 1, wherein at least one of the one or more corresponding sub-image blocks is set as background sub-image blocks if the number of changes determined for the at least one of the one or more corresponding sub-image blocks is less than a threshold percentage of a total number of the plurality of pairs.

4. The method of claim 3, further comprising removing one or more of holes and gaps from the background sub-image blocks by using morphological dilation/erosion operators.

5. The method of claim 1, wherein a pixel has changed if one of the one or more sub-image blocks containing the pixel has changed.

6. The method of claim 1, wherein the at least two images are of a video of a scene.

7. The method of claim 1, wherein the at least two images are of a sequence of images taken by an image recording device.

8. The method of claim 1, wherein determining whether at least one of the one or more corresponding sub-image blocks is considered changed is further based on whether the color level differences are greater than a pre-determined threshold, wherein the pre-determined threshold is based on statistics of the color level differences for two or more corresponding sub-image blocks in the pair.

9. A method of determining a background among a collection of images, comprising:
  receiving a collection of images of a video of a location into memory;
  determining color level differences between corresponding sub-image blocks of a plurality of pairs of the collection of images;
  determining whether at least one of the one or more corresponding sub-image blocks is considered changed based at least in part on statistics of the color level differences for two or more corresponding sub-image blocks in each pair of the collection of images; and
  setting at least one of the one or more corresponding sub-image blocks as background sub-image blocks if the number of changes determined for the at least one of the one or more corresponding sub-image blocks is less than a threshold percentage of a total number of the plurality of pairs of the collection of images.

10. The method of claim 9, wherein the threshold percentage is statistically determined.

11. The method of claim 1, wherein the color level differences comprise grey level differences.

12. The method of claim 9, wherein the color level differences comprise grey level differences.

13. The method of claim 1, wherein the statistics of color level differences for two or more corresponding sub-image blocks are determined based on a histogram of color level differences for the two or more corresponding sub-image blocks in the pair.

14. The method of claim 9, wherein the statistics of color level differences for two or more corresponding sub-image blocks are determined based on a histogram of color level differences for the two or more corresponding sub-image blocks in the pair.

15. The method of claim 1, wherein the one or more corresponding sub-image blocks are based on their pixel coordinate positions.

16. The method of claim 9, wherein the one or more corresponding sub-image blocks are based on their pixel coordinate positions.

17. The method of claim 1, wherein the step of determining whether at least one of the one or more corresponding sub-image blocks is considered changed comprises determining whether the at least one of the one or more corresponding sub-image blocks is considered meaningfully changed.

18. The method of claim 9, wherein the step of determining whether at least one of the one or more corresponding sub-image blocks is considered changed comprises determining whether the at least one of the one or more corresponding sub-image blocks is considered meaningfully changed.

* * * * *

UNITED STATES PATENT AND TRADEMARK OFFICE
CERTIFICATE OF CORRECTION

PATENT NO. : 8,831,357 B2
APPLICATION NO. : 12/268261
DATED : September 9, 2014
INVENTOR(S) : Leonid I. Rudin et al.

It is certified that error appears in the above-identified patent and that said Letters Patent is hereby corrected as shown below:

In the Specification

In column 6, line 38, delete "anchor" and insert --and/or--, therefor.

In column 7, line 22, delete "w, x $w_s$," and insert --$w_s$ x$w_s$,--, therefor.

In column 7, line 56, delete "knoll" and insert --known--, therefor.

In column 8, line 12, delete "de" and insert --$d_B$--, therefor.

In column 8, line 13, delete "$d_B$" and insert --D,--, therefor.

In column 8, line 25, delete "inking" and insert --linking--, therefor.

In column 9, line 26, delete "TC-KOCH" and insert --TC-ROCH--, therefor.

In column 10, line 46, delete "8003" and insert --803--, therefor.

In column 13, line 51, delete "it" and insert --in--, therefor.

Signed and Sealed this
Sixteenth Day of June, 2015

Michelle K. Lee
*Director of the United States Patent and Trademark Office*